June 16, 1942.  E. F. MANGOLD  2,286,367
METHOD OF FABRICATING A CONTAINER
Filed June 28, 1940  2 Sheets-Sheet 1

INVENTOR
Eli F. Mangold

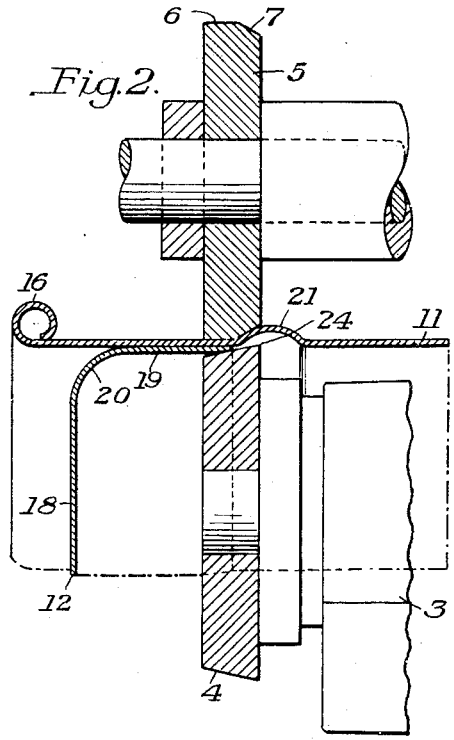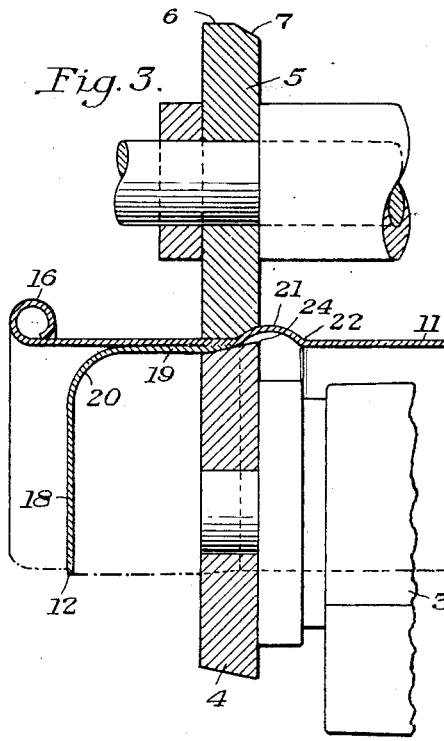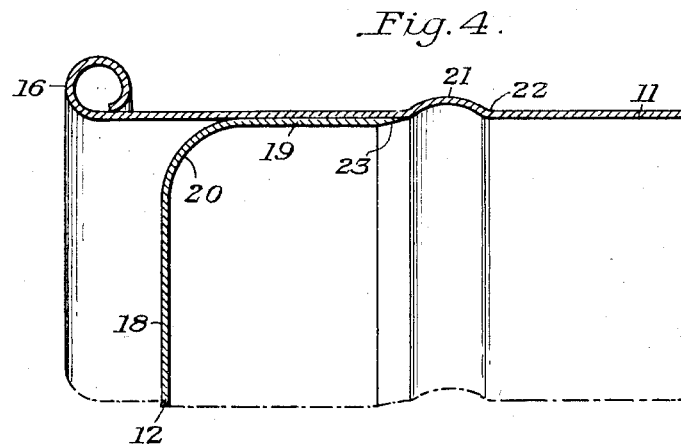

Patented June 16, 1942

2,286,367

UNITED STATES PATENT OFFICE 2,286,367

METHOD OF FABRICATING A CONTAINER

Eli F. Mangold, Dayton, Ohio, assignor to Wheeling Steel Corporation, Wheeling, W. Va., a corporation of Delaware Application June 28, 1940, Serial No. 342,964

3 Claims. (Cl. 113—120)

This invention relates to a method of fabrication. While the method of fabrication was devised primarily for application in the making of containers, the method is of general application and may be used in making other products.

The invention has to do with the making of composite metal articles or other structures and will be described as embodied in the making of a container. The invention has been found of especial importance and value in the making of sanitary food containers. An example of a sanitary food container made in accordance with the invention is a milk can or drum. It is important that food containers, and particularly milk cans, shall not have internal crevices in which food particles may lodge so that they may not be removed when the containers are cleaned. Although milk cans are ordinarily carefully cleaned and sterilized after each use it is still possible for particles to enter into any internal cracks or crevices and remain there even after cleaning, ultimately resulting in contamination of the milk shipped in the cans.

This problem has previously been recognized; in fact, attempts have been made over a long period of years to make a satisfactory sanitary milk products container. Attempts have been made to fill in or cover over crevices in seamed containers and seaming has in some instances been proposed to be replaced by other methods of joining together metal pieces which make up the container, such, for example, as riveting or welding. However, no fully satisfactory sanitary food container of this type has heretofore appeared on the market or been made at all so far as I am aware.

One of the principal difficulties in the fabrication of sanitary food containers is in assembling and connecting together the container body and the bottom in such a way as to completely eliminate internal cracks and crevices. Attempts have previously been made to weld bottoms to containers, but this has not solved the problem as the welding has not produced a smooth interior free from cracks and crevices. I have discovered how to weld a container bottom to a container body so as to eliminate internal cracks and crevices. This welding should preferably be accomplished by employing a tapered internal welding roll and effecting the welding by electric pressure welding. The use of such a tapered welding roll results in tapering one of the metal ends down to a point. However, this in itself may not be and ordinarily is not sufficient. When a tapered internal welding roll is used there is danger of scoring of the inner surface of the container with the point of the roll, which defeats the object of producing a container free from internal cracks and crevices. Also contact of the point of the roll with the work may result in short circuiting the welding current and production of a poor weld.

I provide for forming a depression in one of the metal parts into which the tapered welding roll or other welding instrumentality may project without scoring the inner surface of the container or short circuiting the current. I preferably make the depression such that the tapered or pointed end of one of the members being welded together has its inner surface roughly tangent to the depression whereby to eliminate any opportunity for any substantial internal crack or crevice in the container. The result in practice has been the production of a food container which meets the most rigid sanitary requirements.

Other details, objects and advantages of the invention will become apparent as the following description of a present preferred embodiment thereof and a present preferred method of practicing the same proceeds.

In the accompanying drawings I have shown a present preferred embodiment of the invention and have illustrated a present preferred method of practicing the same, in which Figure 1 is a fragmentary elevational view of a pressure welder which except for the design of the rolls and the particular action of the rolls on the work may be of standard construction;

Figure 2 is a cross-sectional view through the welding rolls showing their cooperation with the work at the commencement of the welding operation;

Figure 3 is a view similar to Figure 2 showing the position of the welding rolls at the end of the welding operation; and Figure 4 is an enlarged fragmentary cross-sectional view of the finished container.

Figure 1:
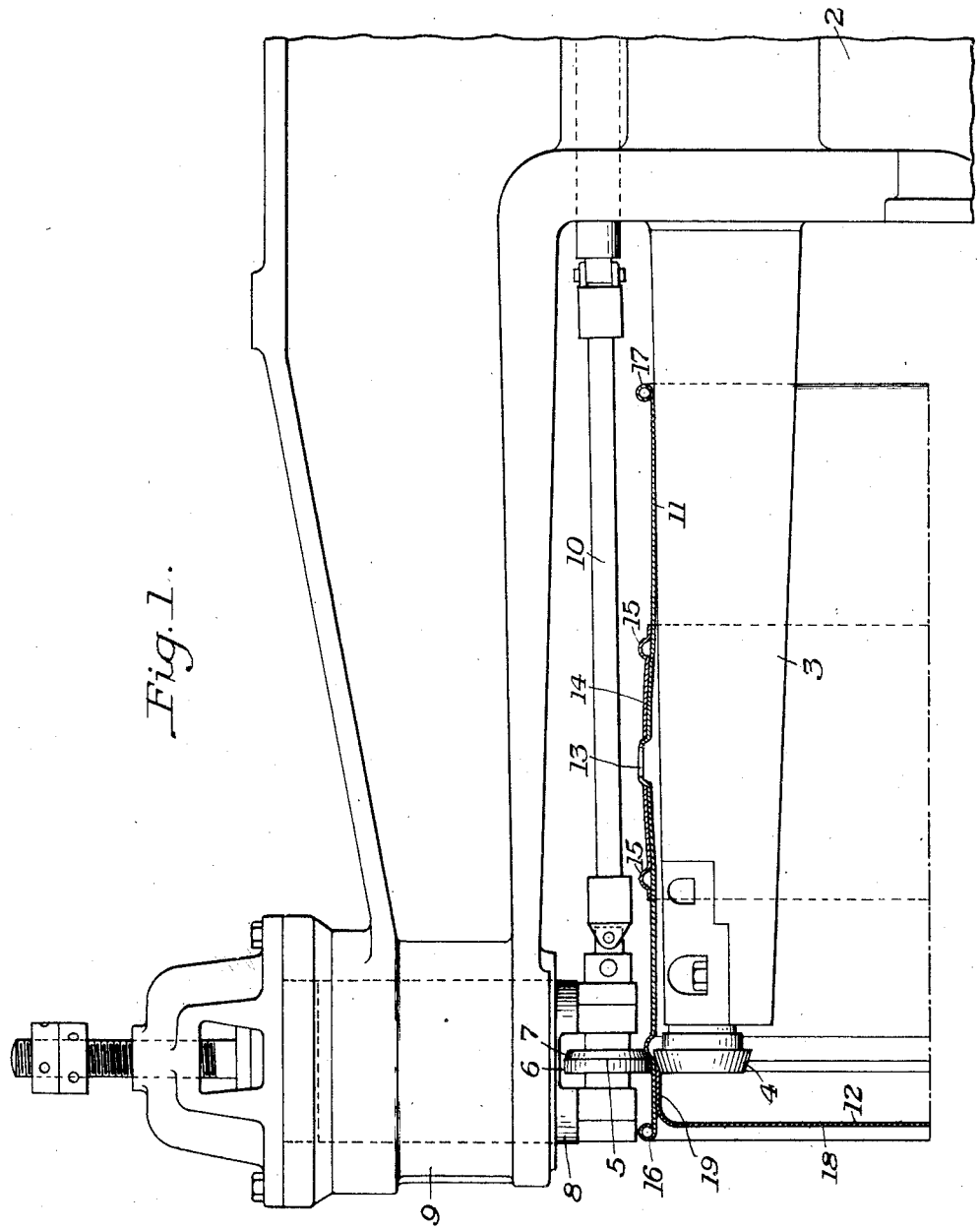

Referring now more particularly to the drawings, the welder shown in Figure 1 may be of standard construction except for the special welding rolls which I provide and the special action which they have on the work. The welder comprises a frame 2 having an anvil 3 provided at its outer end with a tapered internal welding roll 4. In the particular machine shown the roll 4 is not driven but turns by frictional engagement with the work. Cooperating with the internal welding roll 4 is an external welding roll 5 having a cylindrical face portion 6 and an inclined face portion 7. The welding roll 5 is carried by a head 8 vertically movable within a cylinder 9 and is driven through connections 10. Since the general structure of the welding machine may be standard and is well known to any person skilled in the art it will not be described further.

There is shown a container body 11 and a head or bottom 12 which is to be welded to the body 11. The body 11 has an opening 13 shown purely diagrammatically in Figure 1 and which may be of any desired construction and provided with suitable closure means. A rolling ring band 14 may be provided having rolling rings 15. The body 11 is beaded at the bottom at 16 and at the top at 17. The top of the container is adapted to be closed by a cover making a sanitary joint therewith.

The bottom 12 in the form shown in the drawings is of generally pan or dished shape having a substantially flat bottom portion 18 surrounded by a flange 19 which is joined to the bottom portion 18 by an intermediate curved portion 20. The flange 19 extends at approximately right angles to the plane of the bottom portion 18 so that the outer surface of the flange is substantially cylindrical. The edge of the bottom lies substantially in a plane perpendicular to the axis of the cylindrical outer surface of the flange 19.

I form in the container body 11 in the region of its bottom an outward depression or bead 21. This outward depression or bead is preferably formed continuously and circumferentially of the container body and may be formed therein by rolling in well known manner. The bead 21 preferably merges into the surface of the body by curved junction portions or fillets 22.

The body and bottom are made of such size that the bottom fits snugly within the body in telescoping relation as shown in the drawings. When the bottom is to be welded to the body it is introduced into the bottom portion of the body until the edge of the bottom is approximately at the edge of the bead 21 as shown in Figure 2. The edge of the bottom may be preliminarily tapered to the form shown in Figure 4 before the bottom is inserted into the body, although this is not necessary since the welding tapers the edge of the bottom. When the edge of the bottom is not preliminarily tapered it is assembled with the body so that it falls just a trifle short of the edge of the bead since the welding rolls will cause the metal to flow slightly in the longitudinal direction. If, however, the edge of the bottom is preliminarily tapered it will be initially assembled with the body in substantially the relationship shown in Figure 4 with the tapered surface 23 substantially tangent to the bead 21 or to the fillet 22.

When the edge of the bottom is not preliminarily tapered the bottom is introduced into the body to the position shown in Figure 2. To hold the bottom in such position it may be spot welded to the body at three or four places removed from the edge of the bottom. The assembled structure is then introduced into the welder into the position shown in Figure 2 with the edge of the bottom disposed substantially centrally of the welding rolls. The edge of the bottom is then welded to the body by moving the outside welding roll 5 down into welding engagement with the work as shown in Figure 1 and rotating the same and applying the welding current to effect the weld. The work turns or feeds through the rolls as it is being welded. The corner 24 of the internal tapered welding roll 4 projects into the bead 21 as shown in Figure 3, the bead allowing the edge of the bottom to be tapered with its point approximately tangent thereto without any danger of the point 24 of the internal welding roll 4 engaging the interior of the assembled structure whereby to score the same or short circuit the welding current. The cylindrical face portion 6 of the roll 5 engages the body below the bead 21 and the inclined face portion 7 engages the lower portion of the bead as shown. If the weld is trimmed the trimmer may also project into the bead 21 similarly to the welding roll 4 as shown in Figure 3. Thus is insured a strong and satisfactory weld with the inner surface of the bottom merging smoothly into the inner surface of the body without leaving any interior crack or crevice in which food or other particles might become lodged. By the use of my improved method I am enabled to form at low cost a sanitary food container superior to any heretofore produced.

While I have shown and described a present preferred embodiment of the invention and a present preferred method of practicing the same it is to be distinctly understood that the invention is not limited thereto but may be otherwise variously embodied and practiced within the scope of the following claims.

I claim:

1. A method of joining metal parts with one part lying in contact with another and having an edge disposed opposite the metal of the second mentioned part intermediate the edges of the latter, comprising forming an elongated depression in the second mentioned part, positioning the first mentioned part in contact with the second mentioned part with said edge of the first mentioned part lying substantially at the edge of said depression and acting on said parts adjacent said edge of said first mentioned part by opposed welding rolls, one having a recessed portion into which the depressed metal at said depression extends and the other having a face inclined to its axis engaging said edge of said first mentioned part and with an end of said face entering said depression whereby said depression provides clearance for said end so that the latter does not engage the metal of the second mentioned part and by said welding rolls welding said edge of said first mentioned part to the metal of said second mentioned part.

2. A method of joining metal parts with one part lying in contact with another and having an edge disposed opposite the metal of the second mentioned part intermediate the edges of the latter, comprising forming an elongated depression in the second mentioned part, positioning the first mentioned part in contact with the second mentioned part with said edge of the first mentioned part lying substantially at the edge of said depression and acting on said parts adjacent said edge of said first mentioned part by opposed welding rolls one having a recessed portion into which the depressed metal at said depression extends and the other having a face inclined to its axis engaging said edge of said first mentioned part and with an end of said face entering said depression whereby said depression provides clearance for said end so that the latter does not engage the metal of the second mentioned part and by said welding rolls welding said edge of said first mentioned part to the metal of said second mentioned part and causing said edge to merge smoothly into the surface of the metal of the second mentioned part.

3. A method of making a metallic container having a closed end comprising forming a peripherally closed metallic body with a peripherally extending depression therein, forming a metallic closure of generally pan shape to telescope with the body, assembling the body and closure in telescoping relation with the rim of the closure lying substantially at the edge of said depression and acting on the thus assembled body and closure adjacent said rim by opposed welding rolls one having a recessed portion into which the depressed metal at said depression extends and the other having a face inclined to its axis engaging said rim and with an end of said face entering said depression whereby said depression provides clearance for said end so that the latter does not engage the metal of the body and by said welding rolls welding said rim to the metal of said body.

ELI F. MANGOLD.